United States Patent Office 3,161,663
Patented Dec. 15, 1964

3,161,663
NOVEL 17-DESOXY-Δ¹,⁴-PREGNADIENES AND PREPARATION THEREOF
Robert Joly, Montmorency, Julien Warnant, Neuilly-sur-Seine, Jean Jolly, Clichy-sous-Bois, and Bernard Goffinet, Paris, France, assignors, by mesne assignments, to Roussel-UCLAF, S.A., Paris, France, a corporation of France
No Drawing. Filed May 3, 1961, Ser. No. 124,248
Claims priority, application France, May 14, 1960, 827,205; May 16, 1960, 827,304; July 1, 1960, 831,770; July 13, 1960, 832,913
10 Claims. (Cl. 260—397.45)

The invention relates to novel 17-desoxy-corticosteroids having the formula:

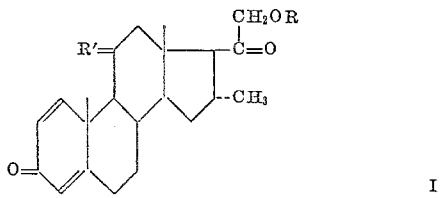

I wherein R is selected from the group consisting of hydrogen, an acyl radical of an inorganic acid and an acyl radical of an organic carboxylic acid having 1 to 18 carbon atoms and R' is selected from the group consisting of

The invention also relates to a novel process for the preparation of said compounds and novel intermediates thereof.

Cortisone activity has until now been believed to be dependent on at least the four following structural features: the presence of a ketone or β-hydroxy in the 11-position, the presence of a 17α-hydroxy group, the presence of a 3-keto group conjugated with a double bond in the 4,5-position, and the presence of a lateral ketol chain oriented in the β-position either free or esterfied. This is why corticosterone or 17-desoxy-hydrocortisone has a very weak anti-inflammatory and glucocorticoid activity.

Applicants have found that surprisingly the compounds of Formula I show a corticoid activity superior to that of prednisone and prednisolone in spite of the lack of a a hydroxyl in the 17-position.

16α-methyl-Δ¹,⁴-pregnadiene-21-ol-3,11,20-trione and 16α-methyl-Δ¹,⁴-pregnadiene-11β,21-diol-3,20-dione can be utilized for treatment of all acute or chronic rheumatic afflictions, of neuralgia of the nerve roots and of lumbar sciatica. They have also been found useful in the treatment of local or generalized inflammatory reactions, in the treatment of edemas of all natures, of infectious dermatitis, of asthma and in the treatment of emphysema and of fibrosis.

They further have the advantage of increasing diuresis and elimination of sodium while increasing only slightly the excretion of potassium contrary to cortisonic compounds used until now. Therapeutic treatment with the said compounds does not require, as is necessary with the usual anti-inflammatory corticosteroids, a constant intake in the organism of potassium salts.

It is an object of the invention to provide novel 17-desoxy-corticosteroids of Formula I.

It is another object of the invention to provide novel processes for the production of 17-desoxy-corticosteroids of Formula I.

It is a further object of the invention to provide novel intermediates for the preparation of 17-desoxy-corticosteroids.

It is an additional object of the invention to provide novel pharmaceutical compositions comprising 17-desoxy-corticosteroids.

These and other objects and advantages of the invention will become obvious from the following detailed description.

The 17-desoxy-corticosteriods of the invention have the formula:

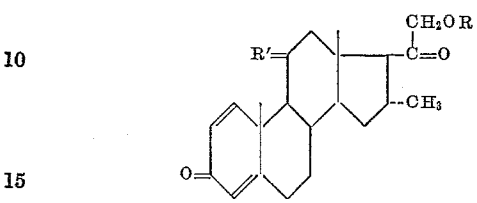

wherein R is selected from the group consisting of hydrogen, an acyl radical of an inorganic acid and an acyl radical of an organic carboxylic acid having 1 to 18 carbon atoms and R' is selected from the group consisting of

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butyl-phenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid. Examples of other suitable acids are sulfonic acids, phosphoric acid and sulfuric acid.

The process of the invention comprises selective halogenation of 16α-methyl-5β-pregnane-3α-ol-11,20-dione to form the 21-halogenated derivative of said compound, reacting the 21-halogenated derivative with a salt of an organic acid in an inert organic solvent to form 21-acyloxy-16α-methyl-5β-pregnane - 3α-ol-11,20-dione, oxidizing the latter to form 21-acyloxy-16α-methyl-5β-pregnane-3,11,20-trione, reacting the said trione with bromine in an organic solvent to form 21-acyloxy-16α-methyl-2α,4β-dibromo-5β-pregnane-3,11,20-trione and reacting the dibromo product with a mixture of lithium carbonate-lithium bromide in an organic solvent to form 21-acyloxy-16α-methyl-Δ¹,⁴-pregnadiene-3,11,20-trione. The latter may be subjected to methanolysis to form 16α-methyl-17-desoxy-prednisone.

The 16α-methyl-17-desoxy-prednisone may be transformed into any 21-acyloxy ester desired by known esterification techniques such as by reaction with an acid anhydride or with an acid halide in the presence of a tertiary amine.

To form 16α-methyl-17-desoxy-prednisolone and its esters, 21-acyloxy-16α-methyl-Δ$^{1,4}$-pregnadiene - 3,11,20-trione is reacted with a semicarbazide salt in an organic solvent in the presence of a buffering agent to form the 3,20-disemicarbazone of 21 - acyloxy-16α-methyl-Δ$^{1,4}$-pregnadiene-3,11,20-trione, the disemicarbazone is reduced by action of an alkali metal borohydride such as potassium, sodium or lithium borohydride in an aqueous organic solvent to form the 3,20-disemicarbazone of 16α-methyl-Δ$^{1,4}$-pregnadiene-11β,21-diol-3,20 - dione and the latter is hydrolyzed under acidic conditions and transformed into the corresponding esters if desired. The reaction scheme of the process is illustrated in Table I.

TABLE I

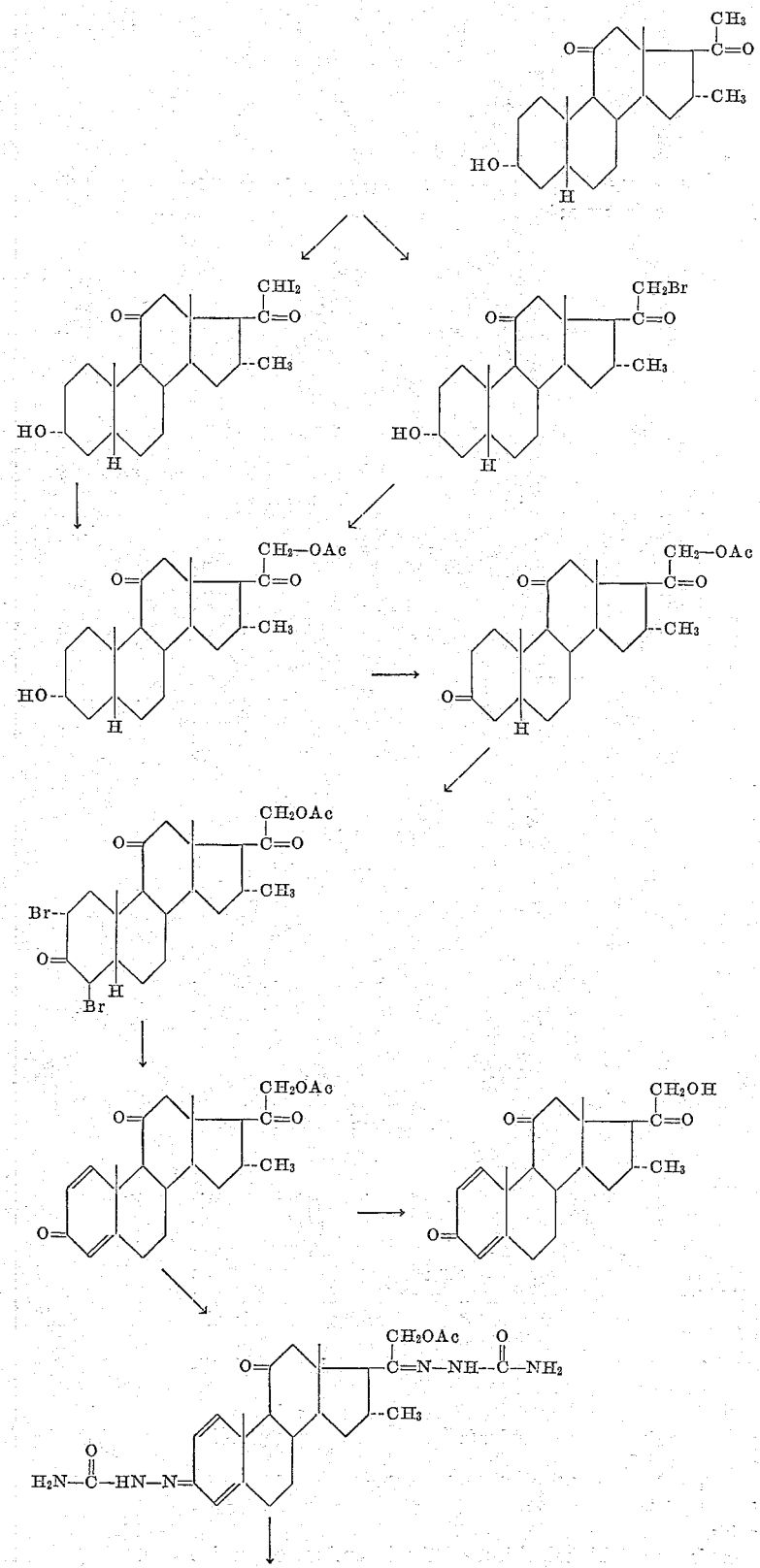

TABLE 1—Continued

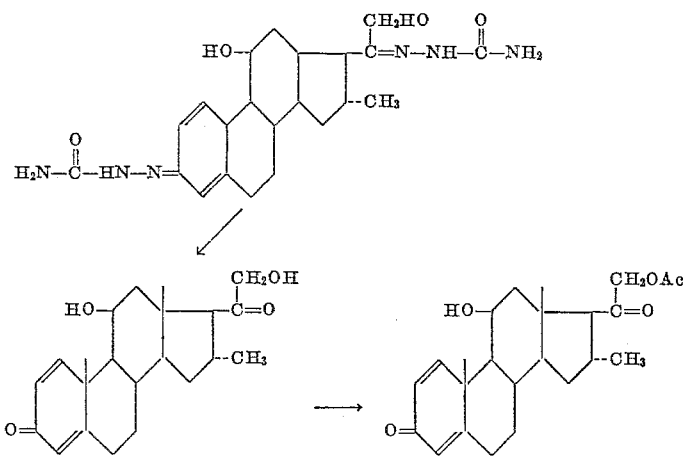

wherein Ac is the acyl radical of an organic carboxylic acid having 1 to 18 carbon atoms.

A preferred process of the invention comprises reacting 16α-methyl-5β-pregnane-3α-ol-11,20-dione with bromine in a lower alkanol such as methanol in the presence of an enolization agent as disclosed in copending application Serial No. 124,247, filed May 3, 1961, now abandoned, to form 21-bromo-16α-methyl-5β-pregnane-3α-ol-11,20-dione, reacting the latter with an alkali metal salt of an organic acid such as sodium acetate in an inert organic solvent such as dimethylformamide to form 21-acyloxy-16α-methyl-5β-pregnane-3α-ol-11,20-dione, oxidizing the said product with chromic acid anhydride in an organic solvent such as acetone to form 21-acyloxy-16α-methyl-5β-pregnane-3,11,20-trione, brominating the latter with bromine in an organic solvent such as ethyl acetate or acetic acid to form 2α,4β-dibromo-21-acyloxy-16α-methyl-5β-pregnane-3,11,20-trione, dehydrobrominating the said product with a mixture of lithium bromide and lithium carbonate in an organic solvent such as dimethylformamide to form 21-acyloxy-16α-methyl-Δ$^{1,4}$-pregnadiene-3,11,20-trione which by methanolysis can be changed to 16α-methyl-17-desoxy-prednisone.

16α-methyl-17-desoxy-prednisolone can be prepared by reacting 21-acyloxy-16α-methyl-Δ$^{1,4}$-pregnadiene-3,11,20-trione with semicarbazide hydrochloride in a lower alkanol such as methanol in the presence of a buffering agent such as sodium bicarbonate or disodium phosphate to form the 3,20-disemicarbazone of 21-acyloxy-16α-methyl-Δ$^{1,4}$-pregnadiene-3,11,20-trione, reducing the latter with an alkali metal borohydride in aqueous tetrahydrofuran to form the 3,20-disemicarbazone of 16α-methyl-Δ$^{1,4}$-pregnadiene-11β,21-diol-3,20-dione, and reacting the latter with pyruvic acid to form 16α-methyl-17-desoxy-prednisolone which can be esterified if desired.

Instead of selectively brominating 16α-methyl-5β-pregnane-3α-ol-11,20-dione in the 21-position and then forming 21-acyloxy-16α-methyl-5β-pregnane-3α-ol-11,20-dione, other selective halogenation techniques may be used. By using the process disclosed in copending application Serial No. 44,851, filed July 25, 1960, now U.S. Patent No. 3,062,848, 16α-methyl-5β-pregnane-3α-ol-11,20-dione can be reacted with iodine in a lower alkanol such as methanol in the presence of calcium chloride and calcium oxide or hydroxide to form 21-diiodo-16α-methyl-5β-pregnane-3α-ol-11,20-dione and the latter can be reacted with an alkali metal salt of an organic acid in an organic solvent to form 21-acyloxy-16α-methyl-5β-pregnane-3α-ol-11,20-dione which can be further reacted in the process of the invention.

In the following examples there are described several preferred embodiments to illustrate the invention. However, it should be understood that the invention is not intended to be limited to the specific embodiments.

*Example 1.—Preparation of 16α-Methyl-17-Desoxy-Prednisone*

STEP A.—PREPARATION OF 21-BROMO-16α-METHYL-5β-PREGNANE-3α-OL-11,20-DIONE

To 50 gm. of 16α-methyl-5β-pregnane-3α-ol-11,20-dione, prepared according to Arth (J. Am. Chem. Soc., 80, 3160, 1958), 375 cc. of methanol were added and the reaction mixture heated to 30° under agitation. Then 0.4 cc. of acetyl chloride was added and 232 cc. of a methanolic solution containing 12.4% of bromine were introduced over a period of about 20 minutes. This introduction was regulated in such a fashion that there is no excess of bromine in the reaction solution. The reaction mixture was cooled by an ice bath in such manner that the temperature did not pass beyond 30° C. Toward the end of the introduction of the bromine solution, the solution had a yellow coloration and the speed of absorption of the bromine diminished.

When the excess of bromine persisted for a period of 3 to 5 minutes, the reaction mixture was poured into a mixture of several liters of water and ice, then vacuum filtered and washed with water. After drying, 62 gm. of a 3% solvate of raw 21-bromo-16α-methyl-5β-pregnane-3α-ol-11,20-dione was obtained. The product tested 19.3% to 19.4% of bromine (theoretical 18.78%); specific rotation $[\alpha]_D^{20}=+117°$ (c.=0.5% in chloroform), and the product can be acyloxylated directly. For analysis, it was recrystallized from isopropyl ether. The product obtained had a melting point of 126 to 127° C. and a specific rotation $[\alpha]_D^{20}=+123.5°\pm3°$ (c.=0.5% in chloroform).

*Analysis.*—$C_{22}H_{33}O_3Br$; molecular weight=425.4. Calculated: C, 62.11%; H, 7.82%; Br, 18.78%. Found: C, 61.8%; H, 7.8%; Br, 18.9%.

This compound is not described in the literature.

On solution of the said compound in formic acid and allowing it to stand for a period of 6 hours at room temperature, the 3-formate of said compound crystallized. It was precipitated in water, vacuum filtered, washed, dried and recrystallized from methanol and isopropyl ether. The product obtained had a melting point of 168–169° C. and a specific rotation $[\alpha]_D^{20}=+137°$ (c.=0.5% in chloroform). The product was soluble in methanol, less soluble in isopropyl ether, poorly soluble in alcohol, insoluble in water.

*Analysis.*—$C_{23}H_{33}O_4Br$; molcular weight=453.41. Calculated: C, 60.92%; H, 7.33%; Br, 17.63%. Found: C, 61.1%; H, 7.5%; Br, 17.6%.

This derivative is not described in the literature.

STEP B.—PREPARATION OF 21-ACETOXY-16α-METHYL-5β-PREGNANE-3α-OL-11,20-DIONE

Into 125 cc. of dimethylformamide, there were introduced with agitation 50 gm. of the raw compound obtained in Step A. It went into solution and, without interrupting the agitation, 25 gm. of anhydrous sodium acetate and 2.5 cc. of acetic acid were added and the reaction mixture was heated to 65° ±2° for a period of 2 hours. It was cooled to 50° to 55° C. and 200 cc. of water were added slowly. The reaction mixture was vacuum filtered, washed with water and dried. 44.8 gm., being a yield of 95.2%, a 21-acetoxy-16α-methyl-5β-pregnane-3α-ol-11,20-dione were obtained, which can be utilized as such for the following step.

For analysis the product was recrystallized from isopropyl ether and ethyl acetate. The product had a melting point of 138–139° C. and a specific rotation $[\alpha]_D^{20} = +96°$ (c.=0.5% in chloroform). It was soluble in two volumes of boiling ethyl acetate, in benzene and chloroform, slightly soluble in isopropyl ether and ether.

Analysis.—$C_{24}H_{36}O_5$; molecular weight=404.54. Calculated: C, 71.25%; H, 8.97%. Found: C, 71.4%; H, 9.0%.

This product is not described in the literature.

STEP C.—PREPARATION OF 21-ACETOXY-16α-METHYL-5-β-PREGNANE-3,11,20-TRIONE 62 gm. of the compound obtained in Step B were dissolved under agitation in 250 cc. of acetone. Without interrupting the agitation and after having cooled the reaction mixture to 0° C., 54 cc. of a solution of 19.3 gm. of chromic acid anhydride, 16 cc. of concentrated sulfuric acid and 48 cc. of water were added over a period of 35 minutes. The reaction was exothermic and the reaction mixture was maintained at 0° C. with the aid of a brine bath. The reaction mixture was maintained for another 3 hours under agitation at the same temperature. During the course of the oxidation, a progressive crystallization was observed. The reaction mixture was then poured into a mixture of water and ice and agitated for some time. 21-acetoxy-16α-methyl-5β-pregnane-3,11,20-trione was vacuum filtered, washed with water and dried. 61.7 gm. of the raw compound were obtained which were purified by recrystallization from methylethyl ketone. There resulted by this process 47 gm. (being a yield of 76% of the pure product) of the pure triketone having a melting point of 224° C. and a specific rotation $[\alpha]_D^{20} = +101° \pm 2°$ (c.=0.5% in chloroform). The product was soluble in 10 volumes of boiling methylethyl ketone, soluble in chloroform, very soluble in acetone, very slightly soluble in alcohol, insoluble in water, ether and benzene.

Anaylsis.—$C_{24}H_{34}O_5$; molecular weight=402.51 Calculated: C, 71.61%; H, 8.51%. Found: C, 71.6%; H, 8.6%.

This compound is not described in the literature.

STEP D.—PREPARATION OF 21-ACETOXY-16α-METHYL-2α,4β-DIBROMO-5β-PREGNANE-3,11,20-TRIONE 20 gm. of the compound obtained in the preceding step were placed in suspension in 600 cc. of ethyl acetate and the mixture was cooled to 0° C. 0.2 cc. of concentrated hydrobromic acid was added and then slowly 5.84 cc. of bromine in proportion to its absorption was added while maintaining the temperature at 0° C. At the start, the compound tended to dissolve in the reaction media, but the dibrominated derivative began to be formed and a crystallization was produced which increased in proportion to the progress of bromination. The agitation was continued at 0° C. for one hour after the introduction of bromine and then the product 21-acetoxy-16α - methyl - 2α,4β - dibromo-5β-pregnane-3,11,20-trione was vacuum filtered and washed with ether until neutralized and dried. 15.7 gm. of the raw compound (being a yield of 56.3%) were obtained, having a melting point (block) of 265° C. and a specific rotation $$[\alpha]_D^{20} = 11° \pm 2°$$

(c.=0.5% in dimethylformamide). The infrared spectra showed that the derivative was a 2α,4β-dibrominated compound. The product tested 27.3% or bromine (theoretical 28.5%) and was sufficiently pure for its transformation in the next step.

This compound is not described in the literature.

STEP E.—PREPARATION OF 21-ACETOXY-16α-METHYL-Δ¹,⁴-PREGNADIENE-3,11,20-TRIONE

A mixture of 400 cc. of dimethylformamide and 40 gm. of lithium carbonate and 40 gm. of lithium bromide was heated to 95° C. under agitation and under a current of nitrogen. Then 40 gm. of the dibrominated derivative obtained in Step D were rapidly introduced and the reaction mixture was maintained, without interrupting the agitation and the current of nitrogen, at 95° C. ±2° C. for a period of 18 hours. The reaction mixture was cooled to 60° C. and the entire amount was poured into a mixture of 4 liters of water and ice containing 120 cc. of acetic acid. This mixture was agitated for a period of one hour, vacuum filtered and washed on the filter with water until the wash water was neutral and free of bromides. After vacuum filtering and drying, 28 gm. (being a yield of 98.5%) of the raw acetate of 16α-methyl-17-desoxyprednisone were obtained.

For analysis, the product was recrystallized from alcohol, then from methylethyl ketone. The pure product had a melting point of 218° C. and a specific rotation $[\alpha]_D^{20} = +195° \pm 2°$ (c.=1% in chloroform). Ultraviolet spectra: $\lambda_{max.} = 239$ mμ, $\epsilon = 14,800$ (alcohol). The product was soluble in 24 volumes of boiling acetone, 30 volumes of boiling alcohol, soluble in chloroform, very slightly soluble in ether and insoluble in water.

Analysis.—$C_{24}H_{30}O_5$; molecular weight=398.48. Calculated: C, 72.33%; H, 7.59%. Found: C, 72.5%; H, 7.6%.

The compound is not described in the literature.

STEP F.—PREPARATION OF 16α-METHYL-Δ¹,⁴-PREGNADIENE-21-OL-3,11,20-TRIONE 1 gm. of the acetate prepared in Step E was placed in suspension under agitation in 15 cc. of methanol and under a current of nitrogen and a solution of 0.5 gm. of sodium bicarbonate in 7 cc. of water was added. The reaction mixture was made to boil one hour at reflux temperature, then acidified by several drops of acetic acid and the methanol was evaporated under vacuum. The reaction mixture was iced and 16α-methyl-Δ¹,⁴-pregnadiene-21-ol-3,11,20-trione was vacuum filtered and washed with water until the wash waters were neutral. The product was vacuum filtered, dried and purified by trituration with ether and recrystallization from ethyl acetate. The pure compound occurred in the form of needles having a melting point of 172° C. and a specific rotation of $[\alpha]_D^{20} = +200° \pm 3°$ (c.=0.5% in chloroform). The ultraviolet spectra showed $\lambda_{max.} = 239$–240 mμ, $\epsilon = 14,800$ (ethanol). The product was soluble in acetone, benzene, chloroform, very soluble in alcohol, very slightly soluble in ether, insoluble in water.

The compound is not described in the literature.

*Example II.—Preparation of 16α-Methyl-Δ¹,⁴-Pregnadiene-11β,21-Diol-3,20-Dione (17-Desoxy-16α-Methyl-Prednisolone)*

STEP A.—PREPARATION OF THE 3,20-DISEMICARBAZONE OF 21-ACETOXY-16α-METHYL-Δ¹,⁴-PREGNADIENE-3,11,20-TRIONE

Into 300 cc. of methanol were introduced 9.7 cc. of water and 27.2 gm. of semicarbazide hydrochloride. The mixture was heated to 30° C. under agitation and 14.85 gm. of sodium bicarbonate were added. Then the mixture was heated to 40° C. and 20 gm. of the acetate of 17-desoxy-16α-methylprednisone prepared by Step E of Example I were added and the reaction mixture was heated to reflux that was maintained for a period of 15 hours. The reaction mixture was cooled to 20° C., poured into a liter of a mixture of water and ice, vacuum filtered and washed with water, vacuum filtered and dried. The raw 3,20-disemicarbazone of 21-acetoxy-16α-methyl-Δ$^{1,4}$-pregnadiene-3,11,20-trione obtained weighed 24 gm. (being a yield of 93%). The nitrogen content was 16.4% (theoretical 16.39%). The specific rotation $[\alpha]_D^{20}=+168°\pm1°$ (c.=1% in dimethylformamide) (on the desolvated product). The ultraviolet spectra showed $\lambda_{max.}$ of 242 mμ (ε=21,900, ethanol) and another $\lambda_{max.}$ of 290 mμ (ε=21,500).

The infrared spectra showed a band at 1740 cm.$^{-1}$ indicating the presence of an acetate function in the 21-position.

The product is not described in the literature.

STEP B.—PREPARATION OF THE 3,20-DISEMICARBAZONE OF 16α-METHYL-Δ$^{1,4}$-PREGNADIENE-11β,21-DIOL-3,20-DIONE 24.15 gm. of the compound obtained in the preceding stage were dissolved under agitation in a mixture of 250 cc. of tetrahydrofuran and 250 cc. of water. A solution of 5.2 gm. of potassium borohydride in a mixture of 50 cc. of water and 5 cc. of normal sodium hydroxide was added and the reaction mixture was heated so that the interior temperature reached 45° C. and was maintained at this temperature for a period of 5 hours. A crystallization was produced in the course of the reduction. The reaction terminated. The mixture was cooled to +10° C., acidified with acetic acid to a pH of 5 to 6 and the tetrahydrofuran was evaporated under vacuum. A mixture of water and ice was added and the mixture was vacuum filtered and washed with water. Raw 3,20-disemicarbazone of 16α-methyl-Δ$^{1,4}$-pregnadiene-11β,21-diol-3,20-dione was obtained with a yield of 100%. It tested 17.1% of nitrogen (theoretical 17.78%) and had a specific rotation $[\alpha]_D^{20}=+187°\pm3°$ (c.=1% in dimethylformamide). The ultraviolet spectra showed:

$\lambda_{max.}$ 240 mμ, ε=19,800 (alcohol)
$\lambda_{max.}$ 290 mμ, ε=20,000

This compound is not described in the literature.

STEP C.—PREPARATION OF 21-ACETOXY-16αMETHYL-Δ$^{1,4}$-PREGNADIENE-11β-OL-3,20-DIONE (ACETATE OF 16α-METHYL-17-DESOXY-PREDNISOLONE)

22 gm. of the compound obtained in Step B were added to 44 cc. of pyruvic acid and 53 cc. of water and the reaction mixture was heated to 70° C. under agitation and under a current of nitrogen. The mixture was maintained at this temperature for a period of 6 hours while introducing 88 cc. of water drop by drop. The yellow-orange suspension was poured into one liter of water and ice and was adjusted to a pH of 9 by addition of sodium bicarbonate. The raw 16α-methyl-17-desoxy-prednisolone formed was vacuum filtered and washed with water. On drying, 13.4 gm. of raw 16α methyl-17-desoxy-prednisolone were obtained, being a yield of 80%.

In order to transform the product into the acetate, it was dissolved under agitation in 100 cc. of pyridine. 50 cc. of acetic acid anhydride were added and the product heated for 2 hours at 40° C. The solution obtained was poured into ice water containing hydrochloric acid in order to neutralize the pyridine and the precipitate was vacuum filtered and washed with water. After drying, 14.2 gm. of the raw acetate of 16α-methyl-17-desoxy-prednisolone was obtained, which was purified by trituration with isopropyl ether, followed by chromatography on alumina. For this, the product was taken up in a mixture of benzene and ether (90 parts of benzene for 10 parts of ether), added to 50 gm. of alumina for chromatography, agitated, filtered and the alumina which retained the resins was washed with the same mixture of solvents. The filtrates were combined and evaporated to dryness, then taken up with ether. The said acetate crystallized. The crystals were iced, vacuum filtered, washed with cold ether and dried. By recrystallization from methylethyl ketone, the pure product was obtained having a melting point of 212° C. and a specific rotation $[\alpha]_D^{20}=+123°\pm1°$ (c.=0.5% in chloroform).

$\lambda_{max.}=243$ mμ, ε=14,900 (ethanol)

The product was soluble in chloroform, fairly soluble in alcohol, slightly soluble in benzene and acetone, very slightly soluble in ether, insoluble in water.

*Analysis.*—$C_{24}H_{32}O_5$; molecular weight=400.5. Calculated: C, 71.97%; H, 8.05%. Found: C, 72.2%; H, 7.9.

The compound is not described in the literature.

STEP D.—PREPARATION OF 16α-METHYL-Δ$^{1,4}$-PREGNADIENE-11β,21-DIOL-3,20-DIONE (16α-METHYL-17-DESOXY-PREDNISOLONE 1.85 gm. of the acetate prepared in Step C were agitated with 16.6 cc. of methanol in a current of nitrogen and a solution of 0.925 gm. of sodium bicarbonate in 7.4 cc. of water was added. The product dissolved rapidly. After an hour of boiling at reflux under a current of nitrogen, the reaction mixture was acidified by the addition of acetic acid until the greenish-yellow appearance of Bromothylmol Blue. The methanol was removed and the solution was added to water and ice. The 16α-methyl-17-desoxy-prednisolone formed was vacuum filtered, washed with water and dried. 1.5 gm. being a yield of 91%, of raw compound were obtained. The product was purified by recrystallization from aqueous acetone. 0.9 gm. of pure 16α-methyl-17-desoxy-prednisolone were obtained for analysis. The product had a melting point of 207° C. and a specific rotation $[\alpha]_D^{20}=+113°\pm2°$ (c.=0.5% in chloroform). The ultraviolet spectra showed $\lambda_{max.}=244$ mμ, ε=15,000 (ethanol). The product was very soluble in alcohol, soluble in chloroform, fairly soluble in acetone, slightly soluble in ether, insoluble in water.

*Analysis.*—$C_{22}H_{30}O_4$; molecular weight=358.46. Calculated: C, 73.71%; H, 8.44%. Found: C, 73.5%, H, 8.4.

This compound is not described in the literature.

EXAMPLE III.—*Preparation of 21-Acetoxy-16α-Methyl-5β-Pregnane-3-Ol-11,20-Dione*

Into a mixture of 20 cc. of pure methanol and 0.5 cc. of methanol containing 10% calcium chloride, there were introduced under nitrogen 5 gm. of 16α-methyl-5β-pregnane-3α-ol-11,20-dione. Then 2.5 gm. of calcium oxide were added and while maintaining the temperature at 26 to 28° C. a solution of 7.32 gm. of iodine in a mixture of 10 cc. of methanol containing 10% calcium chloride and 5 cc. of pure methanol were introduced in small fractions over a period of about one-half hour. The reaction mixture was poured into 450 cc. of water and ice containing 7.5 cc. of acetic acid. The 21-diiodo-16α-methyl-5β-pregnane-3α-ol-11,20-dione formed was vacuum filtered, washed with water and dried.

5 gm. of the diiodo derivative were introduced under nitrogen into a mixture of 50 cc. of acetone, 0.5 cc. of acetic acid and 7.5 gm. of potassium acetate. The reaction mixture was boiled for an hour and a half at reflux. Then the acetone was evaporated to concentrate the reaction mixture to a small volume and the remainder of the acetone was removed after the addition of water. 21-acetoxy-16α-methyl-5β-ol-pregnane-3α-11,20-dione was formed and separated by extraction with ether. The ethereal extracts were combined, washed with water, decanted, dried over magnesium sulfate, filtered and evaporated to dryness. The residue crystallized after trituration with isopropyl ether. It was dissolved in benzene and a solvate of 21-acetoxy-16α-methyl-5β-pregnane-3α-ol-11,20 - dione was separated by addition of cyclohexane. This solvate was taken up with ether and allowed to stand in the refrigerator. Crystals of the desired acetoxylated derivative having a melting point of 137–138° C. and a specific rotation $[\alpha]_D^{20} = +96° \pm 1.5°$ (c.=0.5% in chloroform) formed and were identical to the product formed in Step B of Example I since it give no depression of the melting point.

The compounds of the invention may be administered by oral method, by perlingual method, by transcutaneous injections (intramuscular, intra- and periarticular injections) or by application on the skin and mucous membranes and by rectal administration. They can be used in the form of injectable suspensions, contained in ampules, in multidose flasks, in the form of implants, tablets, suppositories, pomades, creams or aqueous suspensions.

Preferably they are used in the form of injectable suspensions contained in ampules or in multidose flasks, tablets, suppositories, pomades and dermic creams, ophthalmic pomades, collyrium and suspensions for nasal usage.

The dosage used in controlled between 5 and 30 mg. per day in the adult depending upon the method of administration and is preferably administered in an amount of 5 mg. per dose.

*Preparation of Tablets Containing 5 mg.*

In an appropriate mixer there were introduced successively the active principle, white sugar, potato starch and lactose. After homogenizing this mixture, it was added in powdered from into an aqueous solution of gelatin in such a concentration as was necessary and sufficient in order to obtain a powder capable of granulation on a perforated metallic plate.

The granules obtained were spread out in a bed on a tray and placed to dry in a ventilated oven at 50° C. The dry granules were broken and passed through a metal screen of appropriate size, then mixed with talc and magnesium stearate in order to lubricate the same.

The granulated powder was transformed into tablets of adequate weight by mechanical pressure in a press. The average weight tolerance of a lot of ten tablets is ± 5% of the theoretical weight.

For ingestible commodities, it is preferable that the weight of a tablet should not be more than 750 mg. and should not be less than 80 mg. The percentage of active principle in the tablets is preferably between 0.6 and 6%.

*Anti-Inflammatory Activity*

Tests of cotton granuloma following a technique inspired by Singer (Proc. Soc. Exp. Biol. Med., 1956, 92, 23) were made by subcutaneous implantation of two pellets of cotton in the intact rat. 16α-methyl-Δ$^{1,4}$-pregnadiene-21-ol-3,11,20-trione and 16α-methyl-Δ$^{1,4}$-pregnadiene 11β,21-diol-3,20-dione were adminstered two times a day orally for a period of two days. The animals were sacrificed the third day. The granuloma tissue formed was weighed. 16α-methyl-Δ$^{1,4}$-pregnadiene-21-ol-3,11,20-trione possessed an activity 40% superior to that of prednisolone and 16α-methyl-Δ$^{1,4}$-pregnadiene-11β,21-diol-3,20-dione was 80 more active than prednisolone.

The average active doses (doses which diminish by 50% the weight of granuloma formed) were on the order of 1.5 mg. to 2 mg./kg.

*Effects of Hydrosaline Diureses*

The principle technique used was inspired by F. Marcus (Endocrinology, 50, 286, 1952). One operated on intact male rats of 150 to 170 gm. by intraperitoneal injection of a hydrosaline solution of 5 cc. per 100 gm. of animal. The hydrosaline solution was a solution of 9 parts per thousand of sodium chloride. The urine was collected from 0 to 6 hours. The urinary volume was measured. Sodium and potassium were determined by flame photometry. The steroid was injected in aqueous suspension by subcutaneous methods one hour after the hydrosaline injection.

| | Dose, mg./kg. | Variation in excretion in percent of that of the controls | | |
|---|---|---|---|---|
| | | Water | Sodium | Potassium |
| 16α-methyl-Δ$^{1,4}$-pregnadiene-21-ol-3-11-20-trione | 0.3<br>3 | +80<br>+134 | +52<br>+128 | 0<br>+98 |
| 16α-methyl-Δ$^{1,4}$-pregnadiene-11β,21-diol-3,20-dione | 0.3<br>3 | +60<br>+216 | +37<br>+182 | +18<br>+106 |

The values show that the increase of excretion of potassium is less than that of water and of sodium, contrary to that which is observed under the same conditions with the usual cortisones.

*Acute Toxicity*

Tests were made with mice of the Rockland strain weighing between 18 and 22 gm. The compounds were used at a concentration of 10 mg./cc. in suspension in an aqueous dispersant. The suspensions were injected by subcutaneous method in doses of 50 and 100 mg./kg. in lots of 10 mice for each dosage level. The duration of observation after injection was one week. No sign of intoxication nor mortality was noted during this period. Therefore, 16α-methyl-Δ$^{1,4}$-pregnadiene-11β,21-diol-3,20 - dione and 16α-methyl-Δ$^{1,4}$-pregnadiene-21-ol-3,11,20-trione are devoid of toxicity even at doses of 100 mg./kg.

Various modifications of the process of the invention may be made without departing from the spirit or scope thereof and it is to be understood that the invention be limited only as defined in the appended claims.

We claim:

1. 21-acetoxy-16α-methyl-2α,4β-dibromo-5β-pregnane-3,11,20-trione.
2. 3,20-disemicarbazone of 21-acetoxy - 16α - methyl-Δ$^{1,4}$-pregnadiene-3,11,20-trione.
3. 3,20-disemicarbazone of 16α - methyl-Δ$^{1,4}$ - pregnadiene-11β,21-diol-3,20-dione.
4. A process for the preparation of compounds having the formula:

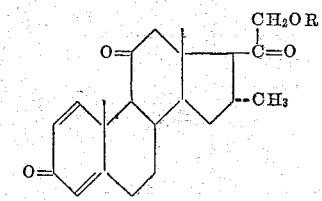

wherein R is selected from the group consisting of hydrogen, an acyl radical of a mineral acid and an acyl radical of an organic carboxylic acid having 1 to 18 carbon atoms which comprises selective halogenation with bromine in a lower alkanol in the presence of an enolization agent of 16α-methyl-5β-pregnane-3α-ol-11,20-dione in the 21-position to form 21-halo-16α-methyl-5β-pregnane-3α-ol-11,20-dione, reacting the latter with a salt of an organic carboxylic acid to form 21-acyloxy-16α-methyl-5β-pregnane-3α-ol-11,20-dione, oxidizing the product to form 21-acyloxy-16α-methyl-5β-pregnane-3,11,20-trione, reacting the said trione with bromine to form 21-acyloxy-2α,4β-dibromo - 16α - methyl - 5β - pregnane-3,11,20-trione, dehydrobrominating the latter to form 21-acyloxy-16α-methyl-Δ$^{1,4}$-pregnadiene-3,11,20 - trione and recovering a compound of the above formula.

5. The process of claim 4 wherein the dibromo product is formed by reaction of 21-acyloxy-16α-methyl-5β-pregnane-3,11,20-trione with bromine in ethyl acetate.

6. The process of claim 4 wherein the dehydrobromination is effected in the presence of a mixture of lithium bromide and lithium carbonate in dimethylformamide.

7. A process for the preparation of compounds having the formula:

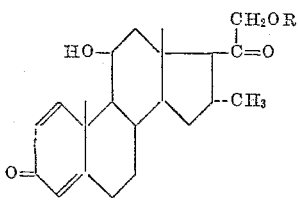

wherein R is selected from the group consisting of hydrogen, an acyl radical of a mineral acid and an acyl radical of an organic carboxylic acid having 1 to 18 carbon atoms which comprises selective halogenation with bromine in a lower alkanol in the presence of an enolization agent of 16α-methyl-5β-pregnane-3α-ol-11,20-dione in the 21-position to form 21-halo-16α-methyl-5β-pregnane-3α-ol-11,20-dione, reacting the latter with a salt of an organic carboxylic acid to form 21acyloxy-16α-methyl-5β-pregnane-3α - ol - 11,20 - dione, oxidizing the product to form 21-acyloxy-16α-methyl - 5β - pregnane-3,11,20-trione, reacting the said trione with bromine to form 21-acyloxy-2α,4β-dibromo-16α-methyl-5β-pregnane-3,11,20-trione, dehydrobrominating the latter to form 21-acyloxy-16α-methyl - $\Delta^{1,4}$ - pregnadiene - 3,11,20 - trione, reacting the latter with a semicarbazide salt in an organic solvent in the presence of a buffering agent to form the 3,20-disemicarbazone of 21-acyloxy - 16α - methyl - $\Delta^{1,4}$-pregnadiene-3,11,20-trione, reducing the disemicarbazone with an alkali metal borohydride in an aqueous organic solvent to form the 3,20-disemicarbazone of 16α-methyl-$\Delta^{1,4}$-pregnadiene-11β,21-diol-3,20-dione, reacting the latter under acidic conditions to form 16α-methyl-$\Delta^{1,4}$-pregnadiene-11β,21-diol-3,20-dione and recovering a compound of the above formula.

8. The process of claim 7 wherein the dibromo product is formed by reaction of 21-acyloxy-16α-methyl-5β-pregnane-3,11,20-trione with bromine in ethyl acetate.

9. The process of claim 7 wherein the dehydrobromination is effected in the presence of a mixture of lithium bromide and lithium carbonate in dimethylformamide.

10. The process of claim 7 wherein the disemicarbazide salt is a semicarbazone hydrochloride and the buffering agent is sodium bicarbonate.

References Cited by the Examiner
FOREIGN PATENTS 269,976    7/50    Switzerland.
710,482    6/54    Great Britain.
807,227    1/59    Great Britain.

OTHER REFERENCES

Wendler et al.: "Tetrahedron," vol. 3 (1958), pages 144–159.

Arth et al.: "J.A.C.S.," vol. 80, June 20, 1958, page 3162.

Boland: "California Medicine," vol. 88, No. 6, June, 1958.

LEWIS GOTTS, Primary Examiner.

L. H. GASTON, M. LIEBMAN, IRVING MARCUS, F. CACCIAPAGLIA, Jr., Examiners.